United States Patent
Mizumura (10) Patent No.: US 6,897,896 B1
(45) Date of Patent: May 24, 2005

(54) TV LENS SYSTEM

(75) Inventor: Hiroshi Mizumura, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 835 days.

(21) Appl. No.: 09/599,828

(22) Filed: Jun. 23, 2000

(30) Foreign Application Priority Data

Jun. 23, 1999 (JP) .......................................... 11-176668

(51) Int. Cl.[7] .......................................... H04N 5/262
(52) U.S. Cl. ............................... 348/240.3; 348/207.1; 348/211.9
(58) Field of Search ......................... 348/240.3, 207.1, 348/211.9, 208, 240, 207, 347, 208.1, 208.2, 208.3, 208.4, 208.5, 208.6, 208.7, 208.8, 207.11, 207.99, 211.99, 211.1, 211.2, 211.4; 396/85, 91–93

(56) References Cited

U.S. PATENT DOCUMENTS

| | | | | |
|---|---|---|---|---|
| 5,457,370 A | * | 10/1995 | Edwards | 318/571 |
| 6,046,863 A | * | 4/2000 | Chino | 359/697 |
| 6,070,016 A | * | 5/2000 | Kaneda | 396/64 |
| 6,115,064 A | * | 9/2000 | Mogi | 348/239 |
| 6,134,390 A | * | 10/2000 | Kasuya | 396/77 |
| 6,172,707 B1 | * | 1/2001 | Ouchi et al. | 348/208.6 |
| 6,587,141 B1 | * | 7/2003 | Tanaka | 348/211.99 |
| 6,720,987 B2 | * | 4/2004 | Koyanagi et al. | 348/36 |

FOREIGN PATENT DOCUMENTS

| | | | | |
|---|---|---|---|---|
| EP | 0869669 | | 10/1998 | |
| EP | 0991269 A2 | * | 9/1999 | H04N/5/232 |
| EP | 0991269 | | 4/2000 | |
| EP | 0991269 | * | 5/2000 | H04N/5/232 |
| JP | 3-98483 A | | 4/1991 | |
| JP | 2810437 | | 7/1998 | |

OTHER PUBLICATIONS

Patent Abstracts of Japan, vol. 1999, No. 03, publication No. 10325918.

* cited by examiner

Primary Examiner—Tuan Ho
Assistant Examiner—Heather R. Long
(74) Attorney, Agent, or Firm—Birch, Stewart, Kolasch & Birch, LLP (57) ABSTRACT

A zoom rate demand is provided with characteristic switches for switching its output characteristics. Each of the characteristic switches is assigned to a corresponding output characteristic, and contents of the characteristic to be assigned to the characteristic switches can be changed by an operator by means of a personal computer.

3 Claims, 5 Drawing Sheets

↓ SELECT 3

FIG. 4(B)

↓ SELECT1

FIG. 4(C)

↓ SELECT1

FIG. 5

TV LENS SYSTEM

BACKGROUND OF THE INVENTION

1. Field of the Invention

The present invention relates generally to a TV lens system, particularly to a TV lens system which can change characteristics with respect to control of positions or moving speed of a focus lens and a zoom lens of a TV lens apparatus.

2. Description of Related Art

In a TV lens system used for a TV camera, lenses such as a focus lens and a zoom lens, which are driven by a motor, are controlled in accordance with control signals outputted from lens controllers for focus and for zoom. Typically, the zoom lens is controlled with its moving speed in accordance with the control signal outputted from the zoom controller, and the focus lens is controlled with its position in accordance with the control signal outputted from the focus controller.

A conventional TV lens system is known in which an operator can select, by using a selecting means such as a switch, a desirable output characteristic of the zoom controller from output characteristics of a plurality of types that are prepared beforehand. The output characteristic of the zoom controller describes an electric voltage of the control signal outputted from the zoom controller with respect to an operational amount of an operating member (e.g. a thumb ring) provided to the zoom controller. If the output characteristic is changed, the response characteristic of a moving speed of the zoom lens with respect to the operational amount of the operating member is changed. The operator can select, depending on demands, a setting of a control characteristic; for example, an operatability of the zoom controller in a low speed range of the zoom lens takes priority to be better than other speed ranges. Japanese patent No. 2810437 recites a TV lens system that can change the response characteristic of the speed control of the controlled member with respect to the operational amount of the operating member in a speed control apparatus for controlling the speeds of the controlled members, in accordance with the operational amount of the operating member, such as controlling the speeds of the controlled members.

However, in a conventional art, in a case to switch the output characteristics of the zoom controller, one characteristic must be selected from the output characteristics of the types that are determined beforehand. Thus, a number of types of the output characteristics to be selected by the operator are limited. Moreover, when increasing types of the output characteristics that can be selected, corresponding numbers of switching means and a memory capacity are required; hence, the numbers are limited. If there are too many types of characteristics, the operator has difficulties in memorizing contents of the output characteristics of various types, and the system becomes inconvenient as a result.

It is more useful if the operator can change the characteristics depending on demands, not only the output characteristics of the zoom controller, but also the characteristics related to control of the optical members (e.g., a zoom lens, a focus lens, an iris, and an extender) that are driven with motors in a TV lens apparatus, such as the output characteristic of the focus controller or a deceleration curve in the proximity of the mechanical stopping end of the zoom lens. However, the same difficulties are caused as the case described above if the characteristics are changeable.

SUMMARY OF THE INVENTION

The present invention has been developed in view of the above-described circumstances, and has as its object the provision of a TV system in which an operator can select sufficient number of characteristics with respect to the control of the optical members which are driven with motors in a TV lens apparatus, without deteriorating its usefulness.

In order to achieve the above-described objects, the present invention is directed to a TV lens system wherein an optical member driven with a motor in a TV lens apparatus is controlled in accordance with one characteristic selected from characteristics of a plurality of types, the TV lens system comprising: a selecting device which selects the one characteristic from the characteristics of the plurality of types; and a changing device which changes at least one of the characteristics of the plurality of types selectable by the selecting device to another characteristic.

Moreover, the present invention is also directed to a TV lens system, wherein: a computer is connectable with a TV lens apparatus; a characteristic with respect to control of an optical member driven with a motor in the TV lens apparatus is set by the computer; and the TV lens system instructs to the TV lens apparatus to control the optical member in accordance with the set characteristic.

According to the present invention, by limiting the number of characteristics selectable by the selecting device at shooting with respect to control of the optical member that is driven with the motor in the TV lens apparatus, the operator will not be confused while the contents of the characteristics that can be selected by the selecting device can be changed; and hence, the selectable characteristics can be assigned from the characteristics of the sufficient number of types. Thus, the operator can select a desired characteristic at shooting by the selecting device. Moreover, the characteristics can be changed by the computer so that the operator can set a characteristic without restriction.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder a preferred embodiment will be described of the TV lens system of the present invention with reference to the accompanying drawings.

Figure 1:
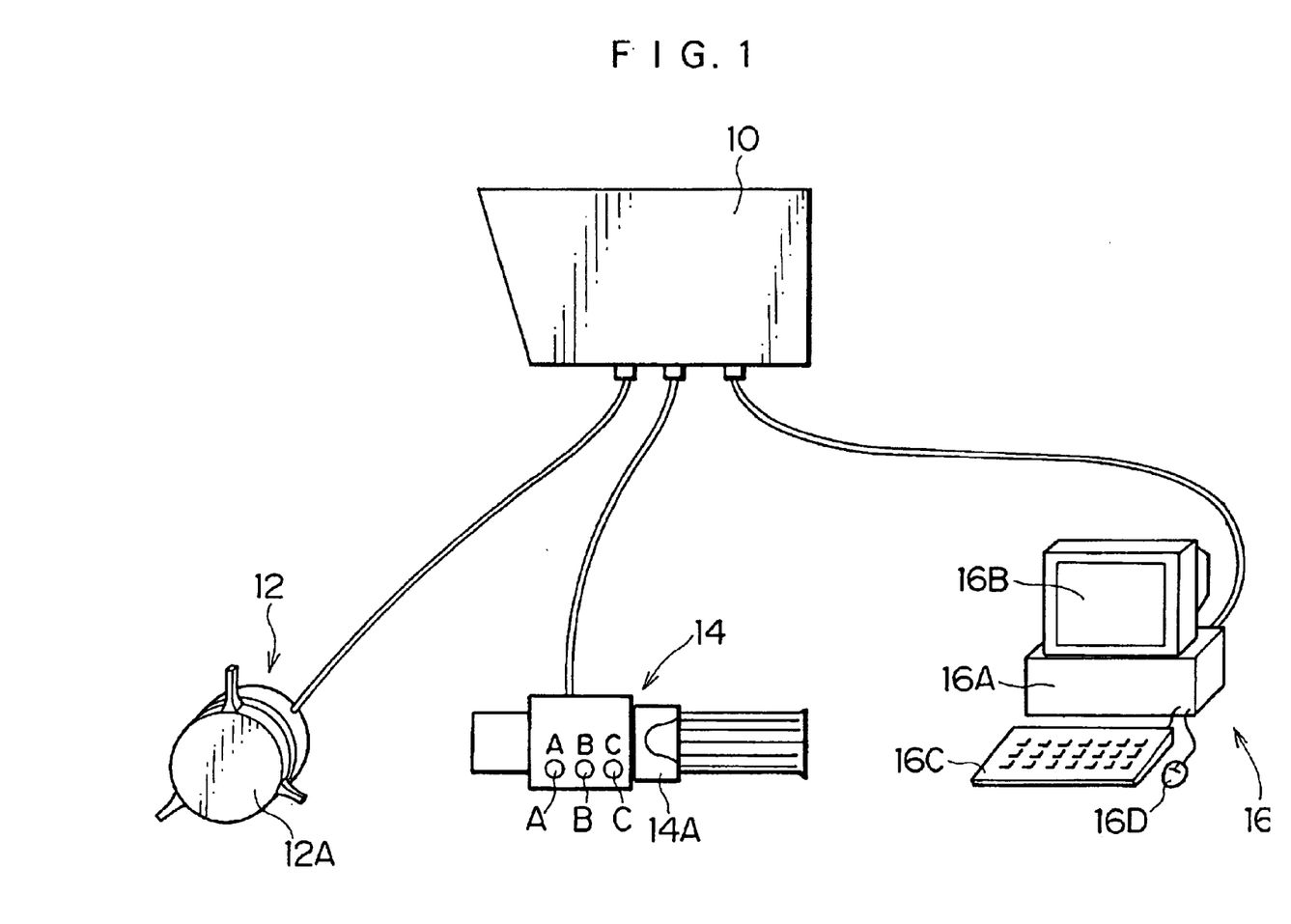
FIG. 1 is an entire view of a TV lens system to which the present invention is applied.

FIG. 1 is an entire view of a TV lens system to which an embodiment of the present invention is applied. As shown in FIG. 1, a focus demand 12 and a zoom rate demand 14 are connected via cables to a lens apparatus (e.g., an EFP lens) 10, which is mounted on a TV camera (not shown). A processing unit such as a personal computer 16 is connectable with the lens apparatus 10 through an interface such as an RS232C via a communication cable.

The lens apparatus 10 includes optical members such as a focus lens, a zoom lens and an iris, and a servo system for driving the optical members with motors.

A focus demand 12 is a controller that is usually mounted to a pan/tilt bar extendedly provided to a pan head for placing the TV camera. The focus demand 12 is provided with a rotatable focus ring 12A for an operator to grasp and operate. The focus demand 12 determines a rotational position of a focus ring 12A and instructs to the lens apparatus 10 with a control signal to move the focus lens to the focus position that corresponds with the rotational position of the focus ring 12A.

A zoom rate demand 14 is a controller that is mounted to the other pan/tilt bar of the pan head as similar with the focus demand 12. The zoom rate demand 14 is provided with a rotatable thumb ring 14A to be operated by a thumb of the operator. The zoom rate demand 14 determines an operation amount (rotational amount) with respect to a reference position of the thumb ring 14A, and instructs to the lens apparatus 10 with the control signal to move the zoom lens at a zoom speed that corresponds with the operational amount. The zoom rate demand 14 also has characteristic switches A, B, and C for switching output characteristics with respect to the control signal in three types. Identification symbols "A", "B", and "C" are printed near the characteristic switches A, B, and C, so that the operator can recognize the switches with the symbols "A", "B", and "C", respectively. The output characteristics of the zoom rate demand 14 will be described later.

The personal computer 16 has a body 16A to which a CPU and the like are mounted, a monitor 16B, which is a display device, a keyboard 16C and a mouse 16D, which are input devices, and so forth. In the personal computer 16, a predetermined application software is executed whereby various controls and settings of the lens apparatus 10 can be instructed on an application execution screen displayed on the monitor 16 by means of the input devices. Operations of the application execution screen will be described later.

Figure 2:
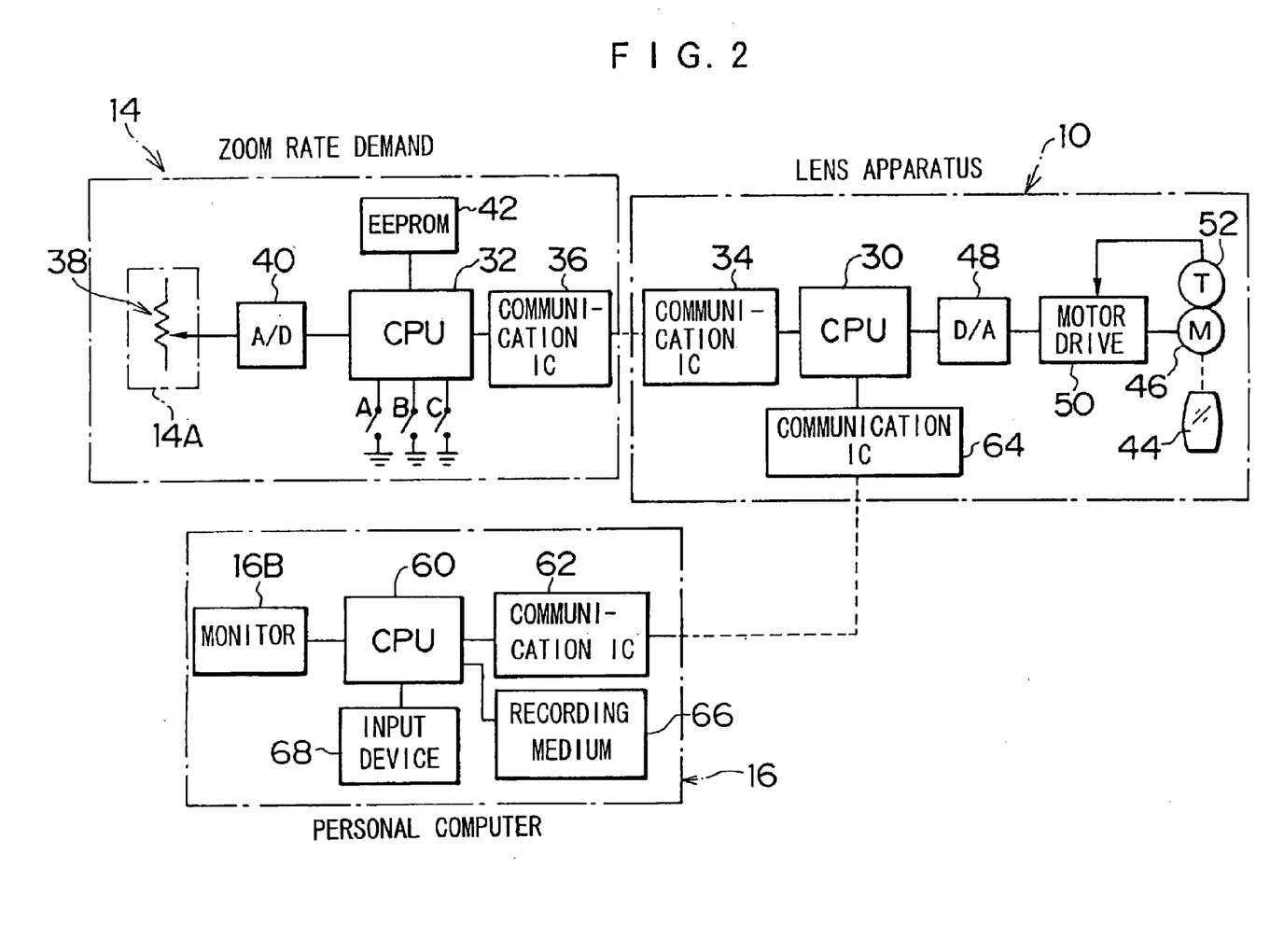
FIG. 2 is a block diagram showing a construction related to control of a zoom lens in the TV lens system.

FIG. 2 is a block diagram showing the construction related to control of the zoom lens 44 in the TV lens system. As shown in FIG. 2, the zoom lens 44 is controlled by the lens apparatus 10 and the zoom rate demand 14. In this embodiment, the personal computer 16, which is connected with the lens apparatus 10, is used when the output characteristics of the zoom rate demand 14 is set. Thus, the personal computer 16 does not have to be connected to the lens apparatus 10 all the time while controlling the zoom lens 44.

A CPU 30 and a CPU 32 are provided in the lens apparatus 10 and the zoom rate demand 14, respectively. Signals are exchanged between the CPU 30 and the CPU 32 through communication control of the communication ICs 34 and 36, which are connected to each other via a cable.

The CPU 32 in the zoom rate demand 14 obtains an operational amount of the thumb ring 14A from a potentiometer 38, which is operationally connected to the thumb ring l4A, via an A/D converter 40, and transmits the control signal to instruct a zoom speed to the CPU 30 of the lens apparatus 10 in accordance with the operational amount of the thumb ring 14A.

The characteristic switches A, B, and C change output characteristics of the zoom rate demand 14 as described above; specifically the switches A, B, and C change in the CPU 32 characteristic curves to be accorded when obtaining a value of the control signal to be outputted with respect to the operational amount of the thumb ring 14A. The data (characteristic data) required for obtaining the control signal in accordance with the characteristic curve corresponding with each of the characteristic switches A, B, and C is stored for example in a rewritable EEPROM 42 (if rewriting is unnecessary, a ROM exclusively used for reading out is acceptable). The CPU 32 reads out from the EEPROM 42 the characteristic data corresponding with one of the characteristic switches that is ON, and obtains the value of the control signal to be outputted with respect to the operational amount of the thumb ring 14A by using the read characteristic data, then outputs the control signal to the CPU 30. The output characteristics of the lens apparatus 10 will be described later.

The CPU 30 of the lens apparatus 10 determines a moving speed (zoom speed) of the zoom lens 44, that is, a rotational speed of a motor 46, which drives the zoom lens 44, in accordance with the control signal transmitted from the CPU 32 of the zoom rate demand 14, and outputs the speed instruction signal for instructing the speed to a motor drive circuit 50 via a D/A converter 48.

The motor drive circuit 50 amplifies a difference between a voltage of the speed instruction signal given from the CPU 30 and an input voltage from a tacho generator 52 to measure an actual rotational speed of the motor 46, and applies the amplified voltage to the motor 46. Thereby, the zoom lens 44 moves at the speed instructed by the speed instruction signal from the CPU 30. In short, the zoom lens 44 moves in accordance with the speed corresponding with the operational amount of the thumb ring 14A of the zoom rate demand 14.

On the other hand, a CPU 60 of the personal computer 16 is connected with the CPU 30 of the lens apparatus 10 so that it can exchange signals with the CPU 30 through communication ICs 62 and 64, which are used for the RS232C and the like. The CPU 60 reads out a predetermined application program, which is recorded in a recording medium 66, and executes the read program. The application program used in this case is a program in which a screen for each control and setting and so forth of the lens apparatus 10 is displayed on the monitor 16B, and each instruction is provided to the lens apparatus 10 in accordance with an input operation performed on the screen by an input device 68. In this description, a program for setting the output characteristic of the zoom rate demand 14 is executed.

The output characteristics of the zoom rate demand 14 will be described. The output characteristics of the zoom rate demand 14 are described with graphs of characteristic curves shown in FIG. 3. Each characteristic curve describes a relationship between an input signal and an output signal in the CPU 32 of the zoom rate demand 14, and specifically describes a value (vertical axis) of the control signal to be outputted to the lens apparatus 10 from the zoom rate demand 14 with respect to an operational amount (horizontal axis) of the thumb ring 14A. Accordingly, if the output characteristic of the zoom rate demand 14 is changed, the zoom speed is changed that is controlled correspondingly with the operational amount of the thumb ring 14A.

Figure 3:
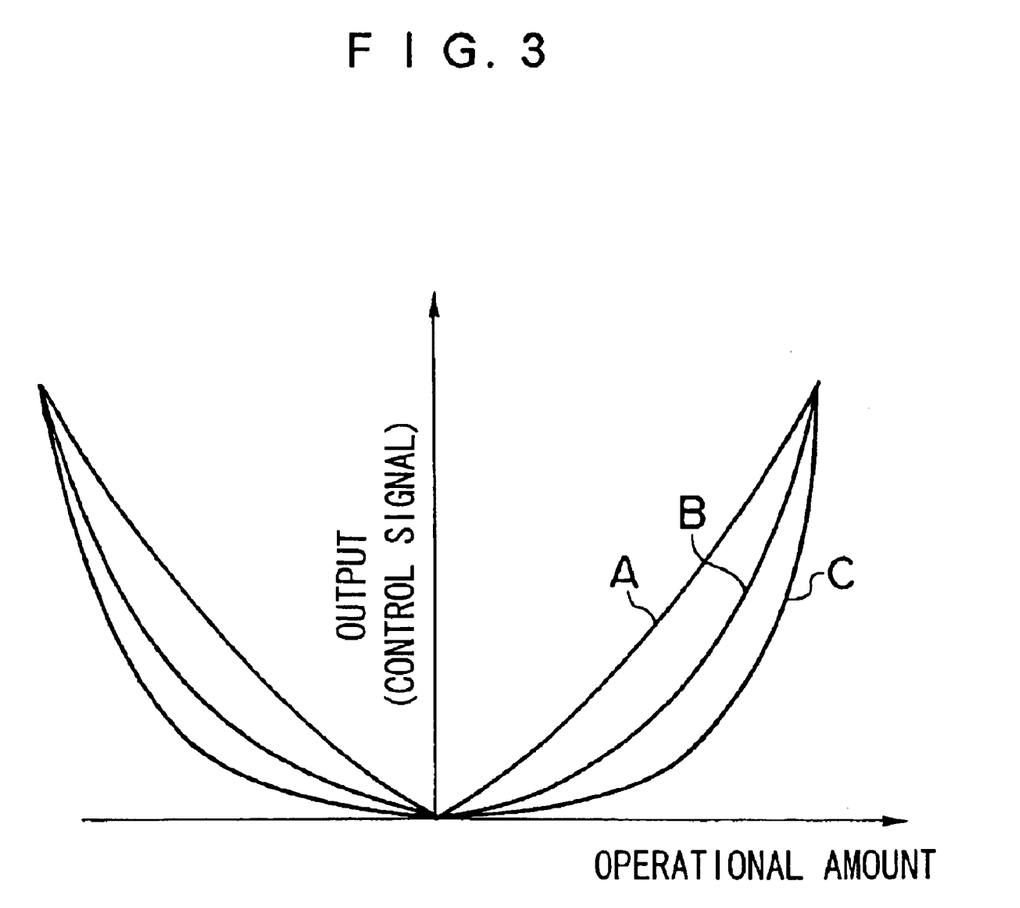
FIG. 3 is an explanatory view for output characteristics of a zoom rate demand.

As described above, the output characteristic of the zoom rate demand 14 is changed by turning one of the characteristic switches A, B, and C on, and the CPU 32 of the thumb ring 14A accordingly changes the characteristic curve, which is accorded when obtaining the control signal to be outputted with respect to the operational amount of the thumb ring 14A, to the designated one of the characteristic curves A, B, and C corresponding with the characteristic switches A, B, and C, respectively, as shown in FIG. 3.

Concerning a procedure for obtaining the control signal accorded by the characteristic curves in the CPU 32, the CPU stores beforehand for example a value of the control signal to be outputted to each value of the input signals (the operational amount of the thumb ring 14A inputted from the potentiometer 38) with respect to each characteristic curve as numeric data. Then, the CPU 32 performs the procedure with reference to the stored data. Alternatively, the CPU 32 can describe each characteristic curve by a formula, and can obtain the control signal to be outputted by calculation with respect to the input signal using the formula. The EEPROM 42 of the zoom rate demand 14 stores characteristic data (numeric data, formula data, and so forth) required to output the control signal in accordance with each of the characteristic curves. The CPU 32 reads out from the EEPROM 42 the characteristic data corresponding with the switch that is ON among the characteristic switches A, B, and C, and then obtains the control signal according to the characteristic curve with respect to the input signal by using the read characteristic data.

A case will next be described where output characteristics of the zoom rate demand 14 that can be selected by the characteristic switches A, B, and C are changed. The number of the output characteristics that can be selected by the characteristics switches A, B, and C is three, which is the same as the number of the characteristic switches. However, the TV lens system of the present embodiment can select and change the contents of the output characteristics that can be selected by the characteristic switches A, B, and C from more numbers of types of the output characteristics. When changing the output characteristics that can be selected by the characteristic switches A, B, and C, that is, when changing a characteristic curve that is assigned to each of the characteristic switches A, B, and C, the personal computer 16 is connected with the lens apparatus 10 as shown in FIGS. 1 and 2, and the personal computer 16 executes an application for lens controlling and setting.

Figure 4A:
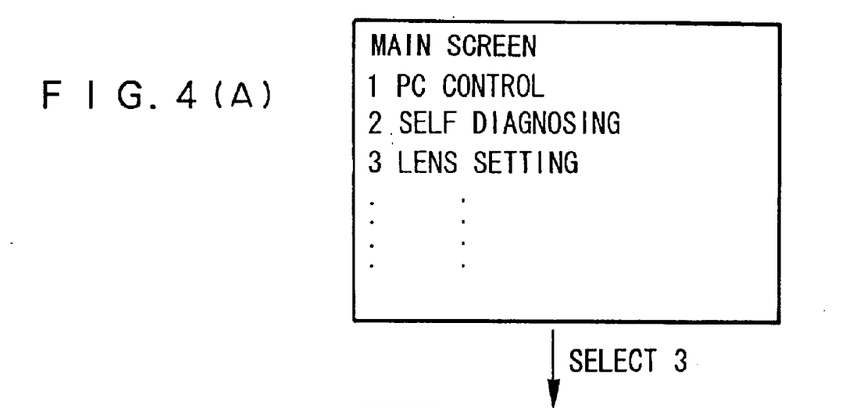
FIGS. 4(A), 4(B) and 4(C) are views of operation screens displayed on a monitor of a personal computer.

FIGS. 4(A)–4(C) and 5 show screens that are displayed on the monitor 16B of the personal computer 16 by execution of the application. As the application is executed, a main screen as one shown in FIG. 4(A) is displayed first on the monitor 16B. In the main screen, following modes can be selected using the personal computer 16: a "PC control mode" for controlling focus, zoom, iris, and so forth of the lens apparatus 10 by means of the personal computer 16; a "self-diagnosing" mode for diagnosing a trouble of the lens apparatus 10; and a "lens setting" mode, which will be described below.

Figure 4B:
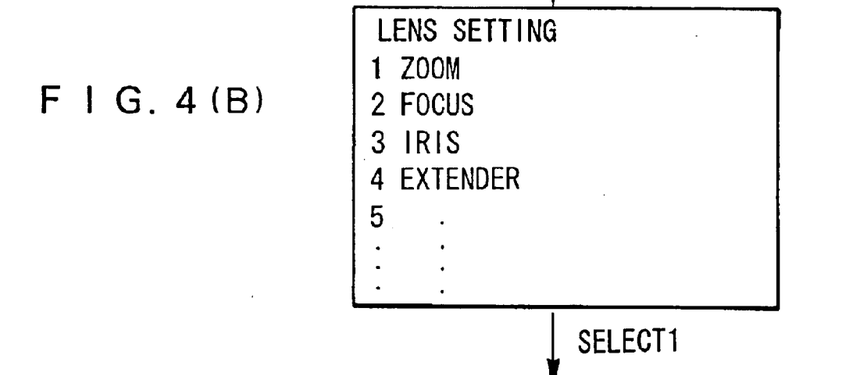

As the "lens setting" is selected in the main screen, a menu screen related to lens setting is then displayed as shown in FIG. 4(B). In the menu screen, settings related to zoom, focus, iris, extender, and so forth, can be selected.

Figure 4C:
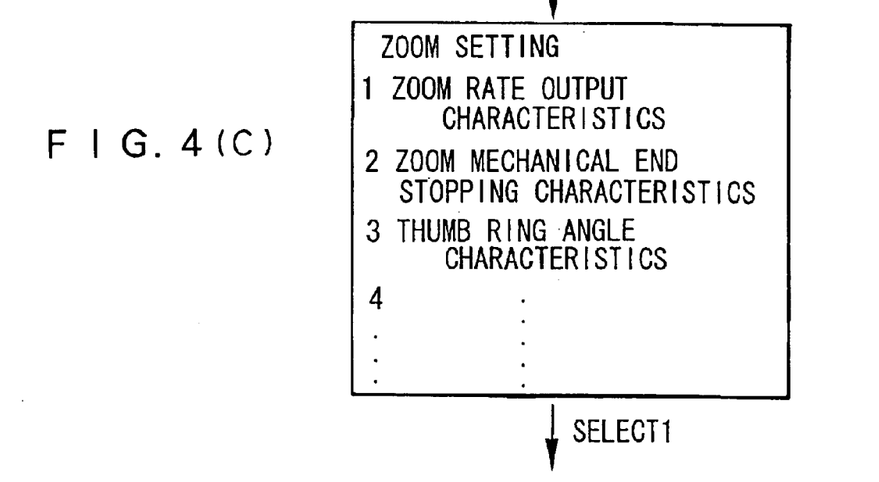

As the "zoom" is selected in the menu screen, a menu screen related to zoom setting is then displayed as shown in FIG. 4(C). In the menu screen, an output characteristic ("zoom rate output characteristic") of the zoom demand 14, a stopping characteristic at a mechanical end of the zoom lens ("zoom mechanical end stopping characteristic"), and so forth, can be selected. If the "zoom rate output characteristic" is selected, a zoom rate output characteristic setting screen is displayed as shown in FIG. 5 for changing the output characteristic that can be selected by the characteristic switch B.

Figure 5:
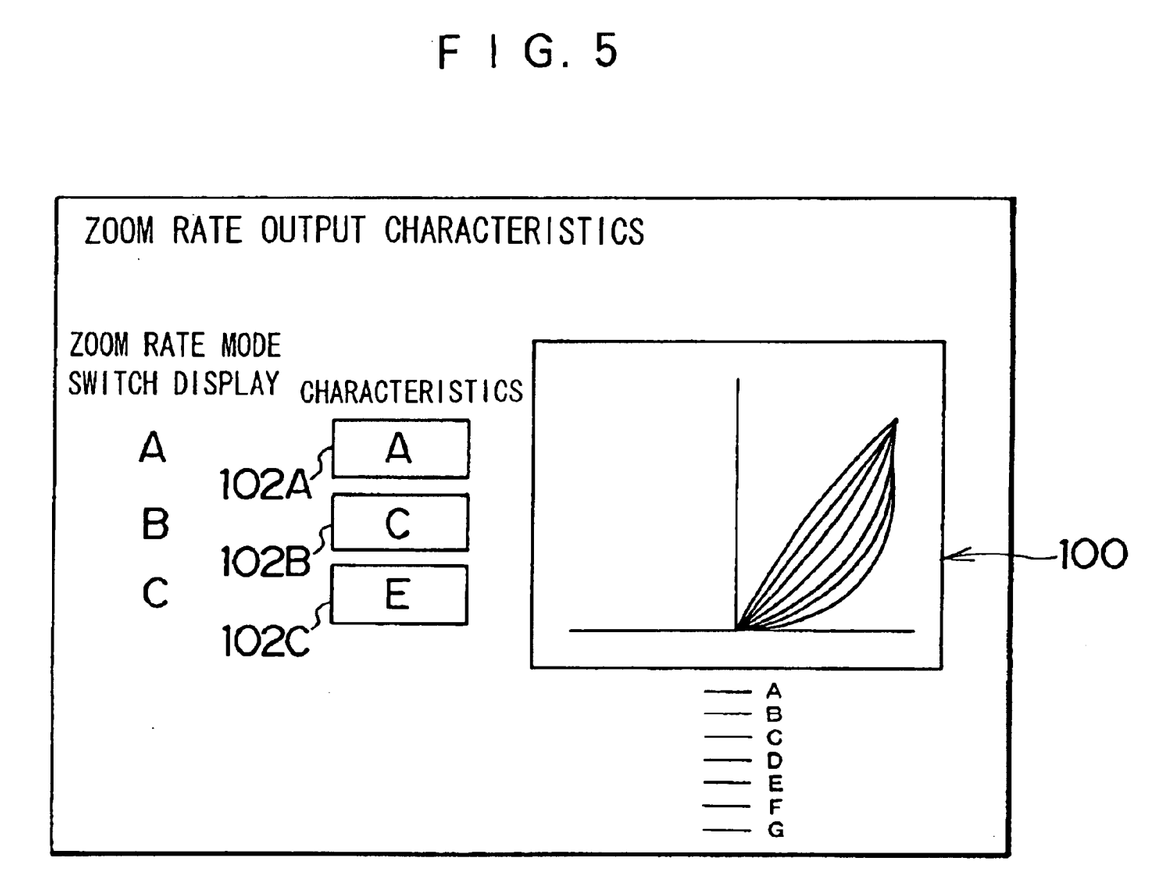
FIG. 5 is a view of the operation screen displayed on the monitor of the personal computer.

As apparent from FIG. 5, a characteristic curve display part 100 is displayed at the right of the zoom rate output characteristic setting screen, and a plurality of types of characteristic curves that can be selected as output characteristics of the zoom rate demand 14 are displayed on the characteristic curve display part 100. In the screen, the curves are displayed in different colors, and identification symbols A, B, C, D, E, F, and G are displayed corresponding with lines of the colors, respectively. The types of the characteristic curves of the colors displayed on the characteristic curve display part 100 can be accordingly identified with the identification symbols A–G, respectively.

On the other hand, the symbols "A", "B", and "C" of the characteristic switches A, B, and C, which are provided to the zoom rate demand 14, and input parts 102A, 102B, and 102C for inputting a type of the characteristic curve to be assigned to each of the characteristic switches A, B, and C, are displayed at the left of the screen.

The operator inputs, using the input device 68, one of the types A–G of the characteristic curves to each of the input parts 102A, 102B, and 102C of each of the characteristic switches A, B, and C by referring to the characteristic curves A–G displayed on the characteristic curve display part 100. Accordingly, a desired characteristic curve can be assigned to each of the characteristic switches A, B, and C. In FIG. 5, the characteristic curves A, C, and E are assigned to the characteristic switches A, B, and C, respectively.

Data related to assigning the characteristic curves that are set as described above is transmitted with an instruction to change the characteristic curves from the CPU 60 of the personal computer 16 to the CPU 30 of the lens apparatus 10. The CPU 30 transmits, to the CPU 32 of the zoom rate demand 14, the instruction and data transmitted from the personal computer 16. Then, the CPU 32 changes the assignment of the characteristic curve with respect to each of the characteristic switches A, B, and C in accordance with the contents set by the personal computer 16.

As the characteristic data of the characteristic curves assigned to the characteristic switches A, B, and C: the characteristic data of numbers of the characteristic curves that are subjects to the selection is stored beforehand in the EEPROM 42; or the characteristic data is generated in the personal computer 16 and the data is then stored in the EEPROM 42; or the characteristic data of numbers of characteristics curves that are subjects to the selection is stored in a certain memory of the lens apparatus 10.

When the characteristic data of numbers of the characteristic curves that are subjects to the selection is stored in the EEPROM 42, the characteristic curves stored in the EEPROM 42 are displayed on the characteristic curve display part 100 in the zoom rate output characteristic setting screen in FIG. 5, which is displayed on the monitor 16B of the personal computer 16. Then, the operator selects a characteristic curve to be assigned to each of the characteristic switches A, B, and C from the characteristic curves displayed on the characteristic curve display part 100. Accordingly, the data related to the assignment of the characteristic curves is transmitted from the personal computer 16 to the zoom rate demand 14 via the lens apparatus 10, and each characteristic curve that is assigned to each of the characteristic switches A, B, and C of the zoom rate demand 14 is changed to the designated one of the characteristic curves stored in the EEPROM 42.

When the characteristic data of the characteristic curves to be assigned to the characteristic switches A, B, and C is generated in the personal computer 16 and the data is then stored in the EEPROM 42, the generated characteristic curves that are subjects to the selection are displayed on the characteristic curve display part 100 in the zoom rate output characteristic setting screen in FIG. 5, which is displayed on the monitor 16B of the personal computer 16. The characteristic curves may be prepared with a certain application program by the operator; alternatively, the characteristic curves may be prepared automatically by an application program. Then, the operator selects a characteristic curve to be assigned to each of the characteristic switches A, B, and C from the characteristic curves displayed on the characteristic curve display part 100. Accordingly, the characteristic data of the selected characteristic curve is prepared in the personal computer 16, and the data related to the assignment of the characteristic curve and the characteristic data of the assigned characteristic curve is transmitted from the personal computer 16 to the zoom rate demand 14 via the lens apparatus 10. Then, the characteristic data previously stored in the EEPROM 42 is updated by the characteristic data transmitted from the personal computer 16, and each characteristic curve that is assigned to each of the characteristic switches A, B, and C of the zoom rate demand 14 is thereby changed.

When the characteristic data of numbers of characteristics curves that are subjects to the selection is stored in the certain memory of the lens apparatus 10, the characteristic curves that are stored in the memory of the lens apparatus 10 are displayed on the characteristic curve display part 100 in the zoom rate output characteristic setting screen in FIG. 5, which is displayed on the monitor 16B of the personal computer 16. Then, the operator selects a characteristic curve to be assigned to each of the characteristic switches A, B, and C from the characteristic curves displayed on the characteristic curve display part 100. Accordingly, the data related to the assignment of the characteristic curves is transmitted from the personal computer 16 to the CPU 30 of the lens apparatus 10. The CPU 30 of the lens apparatus 10 reads out from the memory the characteristic data of the characteristic curves that are assigned to the characteristic switches A, B, and C in accordance with the assignment data, and stores the read data in the EEPROM 42 of the zoom rate demand 14 so as to change the characteristic curves that are assigned to the characteristic switches A, B, and C.

In a case that the characteristic curves that are subjects to the selection to be assigned to each of the characteristic switches A, B, and C are stored in the EEPROM 42 or in the memory of the lens apparatus 10, the assignment may be instructed by a setting means provided to the lens apparatus 10 or to the zoom rate demand 14 rather than being instructed in the personal computer 16.

In the embodiment described above, the three types of output characteristics can be selected by operating the characteristic switches A, B, and C in the zoom rate demand 14; however another embodiment is acceptable where no characteristic switch is provided so that changing of the output characteristics is not possible in the zoom rate demand 14, and the output characteristic of the zoom rate demand 14 can only be changed by selecting one characteristic curve from the plurality of characteristic curves in the personal computer 16.

In the above-described embodiment, the characteristic switches are provided to the zoom rate demand 14; however, the characteristic switches may be provided to the lens apparatus 10.

In the above-described embodiment, the response characteristics of the zoom speed with respect to the operational amount of the thumb ring 14A can be changed by changing the output characteristics of the zoom rate demand 14; however, another embodiment is acceptable where the characteristic curves of the signal outputted from the CPU 30 of the lens apparatus with respect to the signal inputted from the zoom rate demand 14 so as to change the response characteristics of the zoom speed with respect to the operational amount of the thumb ring 14A. The characteristic curves that can be selected by the characteristic switches may be set from numbers of the characteristic curves with the personal computer 16 in such case as well.

In the above-described embodiment, the plurality of characteristic switches are provided in order to select the plurality of output characteristics; however, the plurality of output characteristics may be sequentially switched every time a single characteristic switch (a button) is pressed. In such case, it would be more convenient if type, number, and order to be selected by pressing the single characteristic switch are set wit the personal computer 16.

The output characteristics of the zoom rate demand 14 are described in the above embodiment; however, the present invention is not restricted to this. The present invention can be applied, in the same manner as the above-described embodiment, to change characteristics related to control of any of the optical members (e.g., zoom lens, focus lens, iris, and extender) that are driven with a motor in the TV lens apparatus, such as output characteristics of the focus demand 12 and characteristics of a deceleration curve in the proximity of the mechanical stopping end of the zoom lens, if those characteristics are changeable.

As described hereinabove, according to the TV lens system of the present invention, numbers of characteristics are limited to a certain number that can be selected at shooting with the selecting means related to the control of the optical members that are driven with the motors in the TV lens apparatus; whereby the operator is not confused while the contents of the characteristics that can be selected by the select means can be changed. Therefore, the operator can assign the characteristics that can be selected with the selecting means from the sufficient number of types, and also the characteristic desired by the operator can be selected beforehand with the selecting means at shooting. The operator can also set the characteristics without restriction by changing the characteristics with the computer.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV lens system, comprising:
   a TV lens apparatus; and
   a computer connectable with said TV lens apparatus, said computer setting a characteristic, with respect to control of an optical member driven with a motor in the TV lens apparatus,
   said TV lens system including a zoom controller instructing the TV lens apparatus to control the optical member in accordance with the set characteristic, said computer including a predetermined application software displaying an execution screen on the computer for instructing various controls and settings of the optical member for focus and zoom, and said application software execution screen on the computer instructing selection and changes of characteristics used by said zoom controller, wherein the characteristics include characteristic curves assigned to characteristic switches in a said zoom controller.

2. A TV lens system, comprising:
   a TV lens apparatus; and a computer connectable with said TV lens apparatus, said computer setting a characteristic, with respect to control of an optical member driven with a motor in the TV lens apparatus, said TV lens system including a zoom controller instructing the TV lens apparatus to control the optical member in accordance with the set characteristic, said computer including a predetermined application software displaying an execution screen on the computer for instructing various controls and settings of the optical member for focus and zoom, and said execution screen displaying a plurality of types of characteristic curves to select as characteristics.

3. The TV lens system as defined in claim 2, wherein the characteristics on the execution screen for the characteristic curve are selected and assigned to the characteristic switches and transmitted from the computer to the zoom controller for changing and updating prepared characteristics in a memory of one of the TV lens apparatus and the zoom controller.

* * * * *